United States Patent
Ebadian et al.

(10) Patent No.: US 11,389,805 B1
(45) Date of Patent: Jul. 19, 2022

(54) METHOD AND APPARATUS FOR HDD AND ELECTRONIC WASTE DISPOSAL

(71) Applicant: Phiston Technologies, Inc., Miramar, FL (US)

(72) Inventors: M. Ali Ebadian, Miami, FL (US); Raul Travieso, Miami, FL (US); Douglas Graham, Miramar, FL (US)

(73) Assignee: Phiston Technologies, Inc., Miramar, FL (US)

( * ) Notice: Subject to any disclaimer, the term of this patent is extended or adjusted under 35 U.S.C. 154(b) by 0 days.

(21) Appl. No.: 17/503,463

(22) Filed: Oct. 18, 2021

(51) Int. Cl.
| | |
|---|---|
| *B02C 23/14* | (2006.01) |
| *B09B 3/00* | (2022.01) |
| *B02C 19/00* | (2006.01) |
| *B02C 18/18* | (2006.01) |
| *B03C 1/12* | (2006.01) |

(52) U.S. Cl.
CPC .............. *B02C 23/14* (2013.01); *B02C 18/18* (2013.01); *B02C 19/0056* (2013.01); *B03C 1/12* (2013.01); *B09B 3/00* (2013.01); *B03C 2201/20* (2013.01)

(58) Field of Classification Search
CPC ....... B03C 1/12; B02C 18/18; B02C 19/0056; B02C 23/14; B02C 2201/20; B09B 3/00
See application file for complete search history.

(56) References Cited

U.S. PATENT DOCUMENTS

| | | | | |
|---|---|---|---|---|
| 5,678,773 | A * | 10/1997 | Takamura | ............... B03B 9/061 241/23 |
| 6,439,486 | B1 * | 8/2002 | Nitta | ........................ B02C 2/10 241/29 |
| 7,324,321 | B2 | 1/2008 | Olliges | |
| 7,852,590 | B1 | 12/2010 | Olliges | |
| 8,064,183 | B2 | 11/2011 | Olliges | |
| 8,794,559 | B1 | 8/2014 | Olliges et al. | |
| 9,776,192 | B2 | 10/2017 | Ebadian et al. | |
| 10,071,382 | B1 | 9/2018 | Ebadian et al. | |
| 10,242,699 | B1 | 3/2019 | Ebadian et al. | |
| 10,657,345 | B1 | 5/2020 | Ebadian et al. | |
| 2013/0263699 | A1 * | 10/2013 | Harris | ....................... B22F 9/16 75/363 |
| 2016/0082442 | A1 * | 3/2016 | Sabol | ..................... B02C 18/16 241/46.06 |
| 2017/0253891 | A1 * | 9/2017 | Gitschel | ................... B03B 9/06 |
| 2020/0078796 | A1 * | 3/2020 | Kochhar | .................. B03C 1/23 |

* cited by examiner

*Primary Examiner* — Michael McCullough
*Assistant Examiner* — Kalyanavenkateshware Kumar
(74) *Attorney, Agent, or Firm* — McHale & Slavin, P.A.

(57) ABSTRACT

A method and apparatus for use in destroying a data storage device and separating materials for recycling. The apparatus employs: a first stage of rough cutting wherein the data storage device is shredded into pieces approximately 30 mm×30 mm; a second stage that separates shredded metal material, such as spindles, from non-metal material by use of a magnetized roller having a scraper to the metal material to a first bin and non-metal material to a third stage having an upper level shredder and a lower level shredder for grinding the non-metal material into particle sizes of 10 mm×10 mm or less.

21 Claims, 10 Drawing Sheets

METHOD AND APPARATUS FOR HDD AND ELECTRONIC WASTE DISPOSAL

FIELD OF THE INVENTION

This invention is related to the field of sensitive material destruction and, in particular, to a method and apparatus for treating media storage devices and electronic waste for disposal.

BACKGROUND OF THE INVENTION

Sensitive information is commonly stored on hard disk drives "HDD", solid state drives "SSD", and the like devices used for storage of data. The storage devices are coupled to motherboards, switches, caddies, brackets and the like; components which may be difficult to separate when the storage device has to be replaced or otherwise disposed of. It is critical that all data disposed of is unrecoverable. Government loss of sensitive data can be catastrophic. Business loss of sensitive date can result in trade secret theft and business advantage over a competitor. Individual loss of sensitive data can result in identity theft. No matter how trivial the theft may appear, the resulting harm can be irreparable.

When the life of a data storage device has ended, ideally the memory unit is removed from service and physically destroyed to assure that the stored information cannot be retrieved. Various apparatuses exist wherein the stored digital data is electronically or physically destroyed upon removal the data storage. The goal being to assure that any sensitive material on the disk has been rendered unusable.

Various data destroying apparatus are described in Applicant's prior patents such as U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid. State Drive Disintegrator; U.S. Pat. No. 10,242,699 for a Single Pulse Degaussing Device; and U.S. Pat. No. 10,657,345 for a Media Destruction Verification Apparatus.

Data storage devices can be changed out due to lack of capacity or speed, mechanical malfunction, or simply due to a computer hardware/software upgrade. However, it is not always practical to separate the data storage device from the underlying supporting components. It is not uncommon for the entire computer to be disposed of and, if the consumer is not cognizant of which storage device is to be removed, the data storage device may be discarded with all data readily accessible. While certain types of devices used to store electronic media is easily removed, switchboxes, solid state drives, and other devices that may employ flash memory may require absolute destruction to help ensure that meaningful data cannot be extracted from the disks. While one solution is to shred the HDD, the disposal of only the HDD does not address other flash memory storage. Waste created by support components such as high-capacity hard drives with brackets or sleds, heat resistant magnetic recording (HR), microwave assisted magnetic recording (MAMR), perpendicular magnetic recording (PMR), rack switches, switch boxes, spindles, and so forth may be untouched. For this reason, the proper way to destroy media would be to destroy the memory storage and all associated components. However, simply shredding material leads to a mixture of metal and plastic making the waste non-recyclable leading to yet another problem. The millions of electronic devices that are disposed of that are shredded result in contaminated waste. Those devices that are not shredded may include sensitive data that can be absconded with and will consume unnecessary air space in landfills. For instance, a desktop computer placed in a landfill will result in a large airspace within the cabinet that consumes valuable landfill. Removal of the HDD may protect address certain sensitive material but any flash memory left with the computer remains accessible and may include additional sensitive material. Further, removal of an HDD from a laptop is difficult wherein an owner may simply dispose of the laptop in a landfill in hopes that a nefarious act will not take place. Simply shredding the electronic device results in unusable contaminated waste.

What is lacking in the industry is a method and apparatus for destroying data storage devices and associated component by a three-stage process that allows for recycling.

SUMMARY OF THE INVENTION

Disclosed is an apparatus to destroy a data storage device and prepare for recycling. The apparatus employs: a first stage of rough cutting wherein the data storage device is shredded into pieces approximately 30 mm×30 mm; a second stage that separates the shredded pieces by use of a magnetized roller having a scraper to direct material consisting of metal to a first bin and directing non-metal material to a third stage; the third stage further grinding the remaining material into particle size of 10 mm×10 mm or less.

An objective of the invention is to provide a single apparatus having stages for shredding and separating of material wherein the apparatus destroys all media and separates the shredded particles for proper recycling.

Accordingly, it is an objective of the instant invention to provide a data storage device shredding of HDD and magnetic data carriers to a security level of less than H6 per DIN 66399.

An objective of the invention is to have a first stage rough cut to reduce all material to 30 mm×30 mm or less, a second stage to separate large steel components such a brackets and spindles; and a third stage to have a fine cut particle size of 10 mm×10 mm or less for final destruction of platters, ceramic chips and so forth.

It is a further objective of the instant invention to employ a magnetized roller in the second stage together with a roller scraper separation and collection of metal materials.

Yet another objective of the invention is a feeder to transfer data storage devices to the first stage shredder, the storage devices are gravity fed into the first stage shredder.

Yet still another objective of the invention is provide a method and apparatus for treating media storage devices and electronic waste for disposal having a destruction rate of about 7-10 seconds.

Still another objective of the invention is to eliminate the need disassemble media storage devices, saving time and labor costs.

Other objectives and advantages of this invention will become apparent from the following description taken in conjunction with any accompanying drawings wherein are set forth, by way of illustration and example, certain embodiments of this invention.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
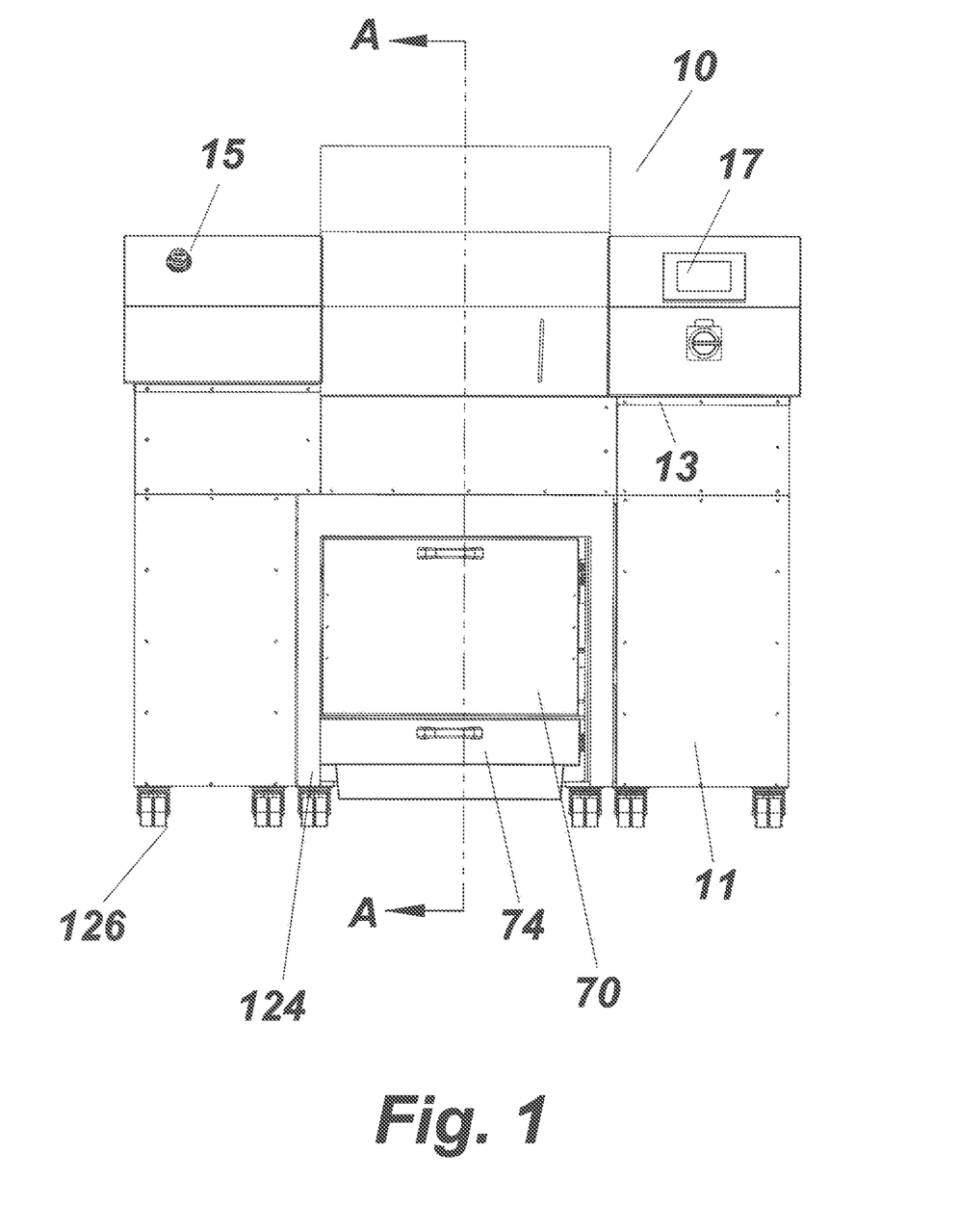
FIG. 1 is a front plane view of the HDD and electronic waste disposal apparatus of the instant invention with shielding in place.
Figure 2:
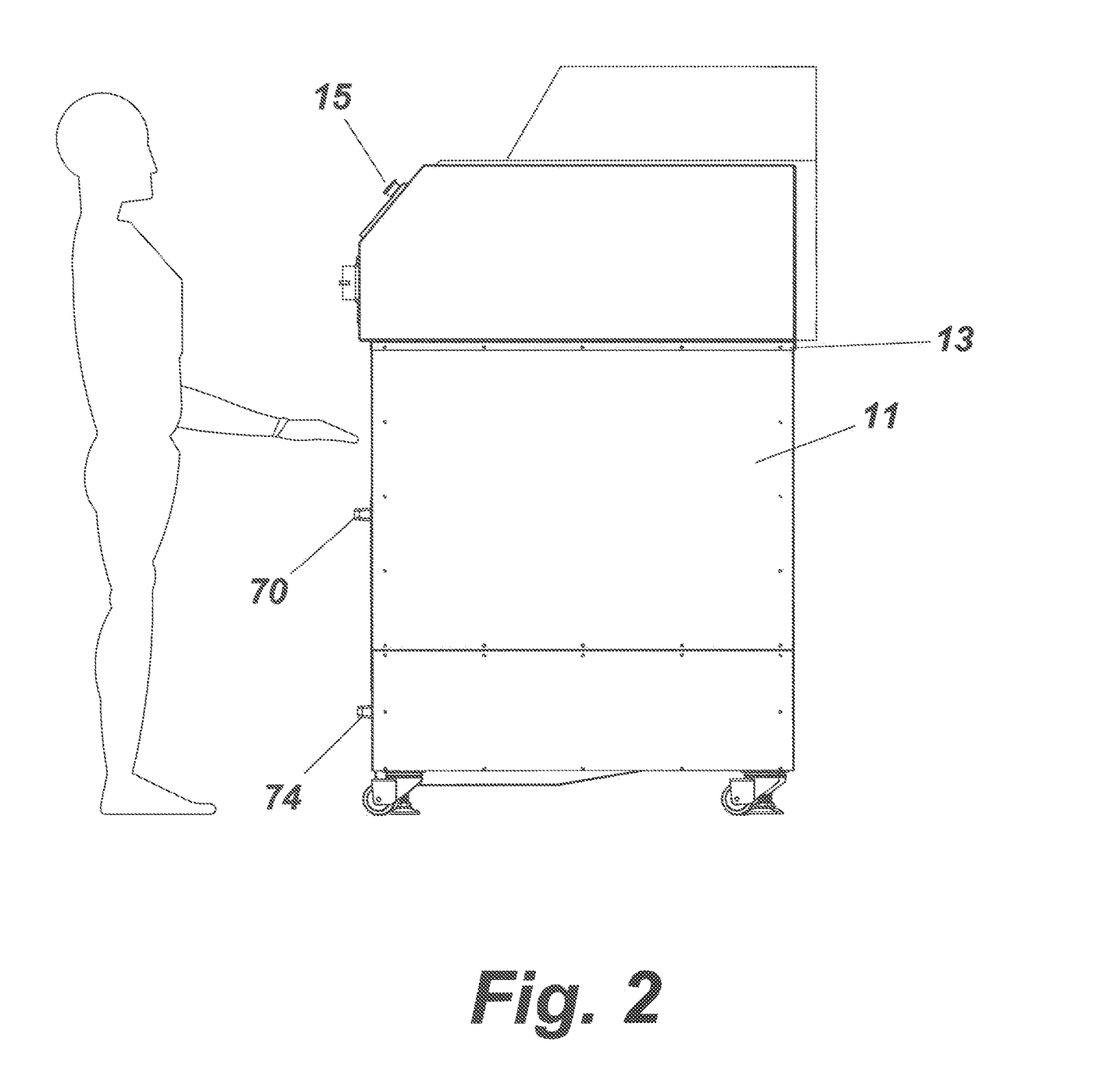
FIG. 2 is a right side view thereof.
Figure 3:
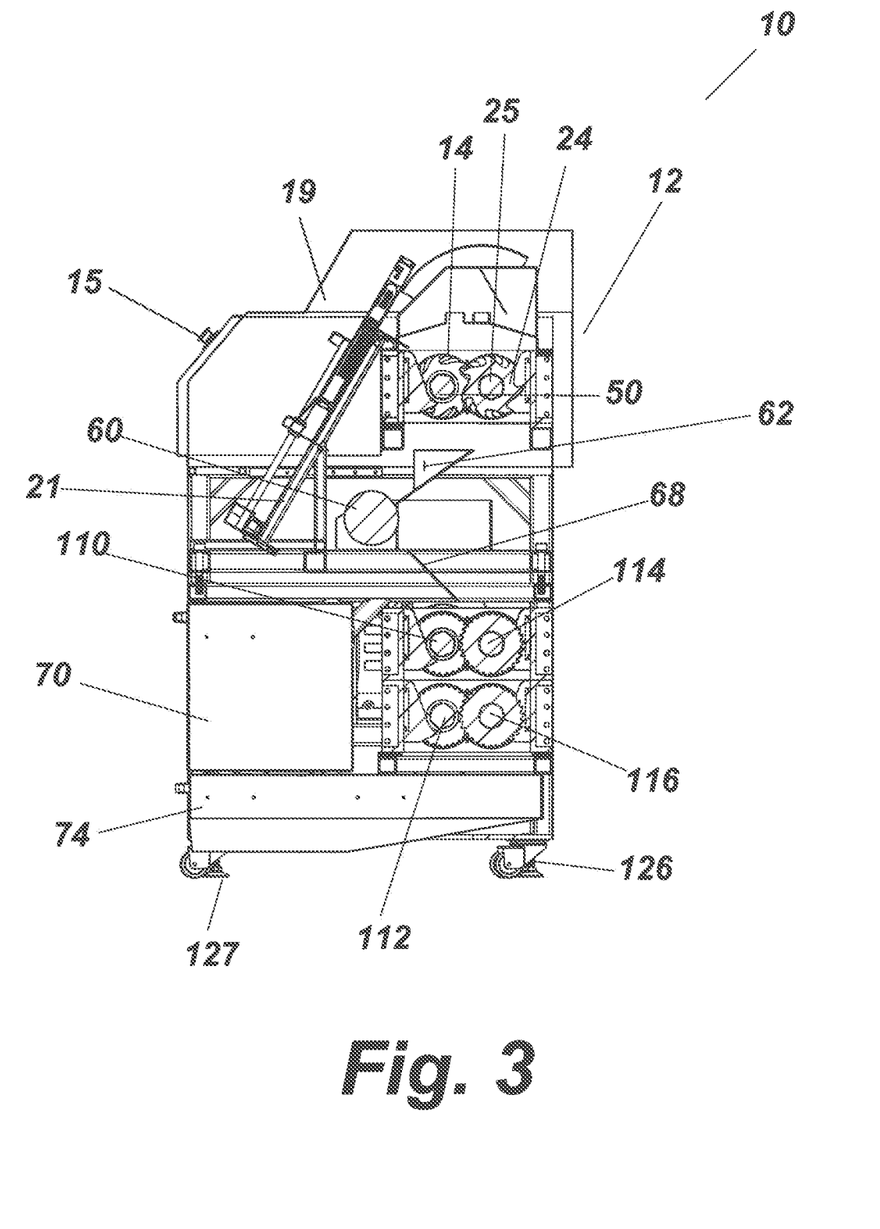
FIG. 3 is a cross section view taken along lines A-A of FIG. 1.
Figure 4:
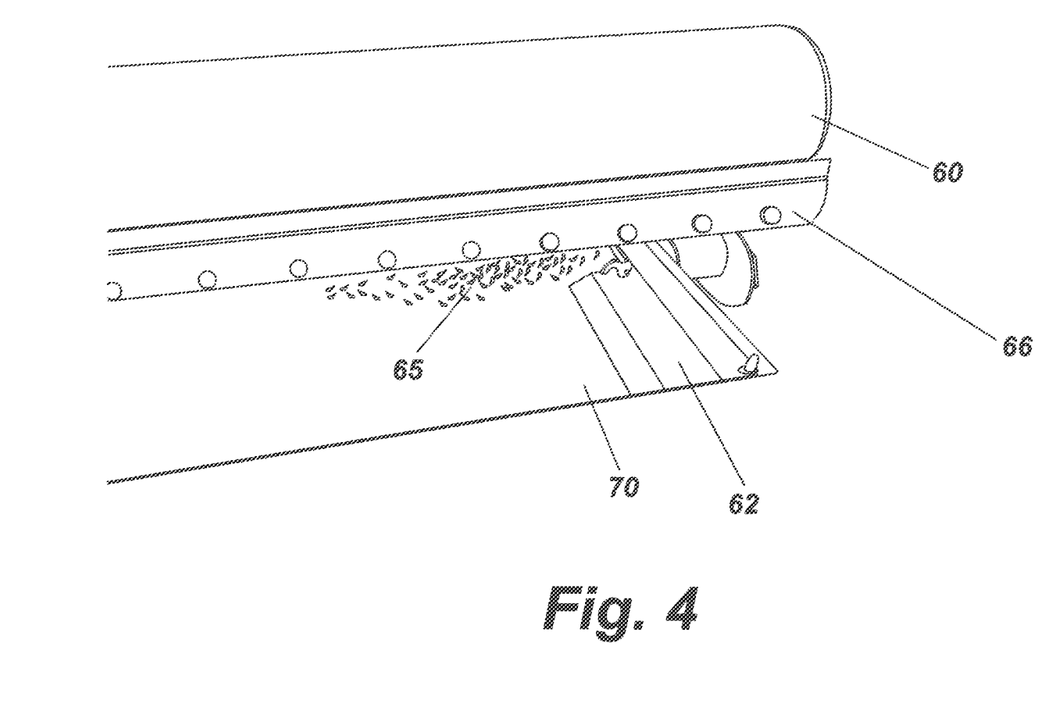
FIG. 4 is a front perspective view of the magnetic roller.

Referring to FIG. 1, depicted is the HDD destruction and electronic waste disposal apparatus 10 having sound and protective shields 11 attached to a frame 13. The front of the apparatus 10 including an emergency shut off 15 and a control panel 17. Referring now in general to the Figures, the apparatus 10 and method comprises an automatic feeder 19 having a conveyor slot 21 to deliver HDD and the like devices to be destroyed to a first stage shredder 12 that includes a plurality of clockwise rotating large cut knives 14 each having a 179.92 mm outer diameter 16, a 70 mm inner diameter 18 and a 12 mm width 20. A shaft 25 having opposing flat surfaces 27 spaced apart 64.50 mm forming a hexagon shape. While a hexagon shape is depicted, it will be obvious to one skilled in the art that the shaft may be splined, or otherwise of a shape to assure positive transmission of torque from the shaft to the knives and spacers. Each knife 14 having scallops 22, in a preferred embodiment there are seven scallops on each knife 14. Between each knife 14 is a spacer 24 having a 90 mm outer diameter 26, a 70 mm inner diameter 28 and an 8.80 width 30 with forty one teeth 32. The inner diameter 28 constructed and arranged to receive the shaft 25. A first electric motor 50 is coupled to a gear box 42 for rotating of the shaft 25 in a clockwise direction. A second motor 44 drives a second gearbox 46 having a counter-clockwise rotation of a second shaft 50 with a plurality of reciprocal cutting knives and blades forming a mirror image of first set of knives and spacers forming an interlaced set of knives and spacers. For ease of clarity a single set of knifes 14 and spacers 24 is depicted but it is understood that the clockwise rotation and counter-clockwise rotation is constructed and arranged to shred material passing between the teeth to particles no greater than 30 mm by 30 mm for the first stage. Each knife 14 is constructed from H9 steel having hardness between HRC60 to HRC54. Each spacer 24 is constructed from H13 steel having hardness between HRC52 to HRC54.

The first stage directs shredded material to a second stage for drawing metal particles. The second stage comprises a magnetized roller 60 that receives shredded material that is funneled to the roller 60 by a ramp surface 62. A roller motor 64 rotates the roller 60 which is steel with an electro magnet causing metal particles to adhere to the roller. Metal particles 65 are removed from the roller 60 by a scraper 66, the metal particles directed to a first bin 70, non-metal particles that do not adhere to the roller are directed to a third stage by a directional chute 68. Metal particles include spindles, brackets, sleds and the like metal materials that are difficult to shred to a size less than 30 mm. Since metal particles do not store data, they do not need to be shredded further saving energy in the limited process. The scraper 66 is positioned adjacent to the roller 60 and used to scrape the metal materials 65 as the roller 60 spins. The metal material removed from the roller 60 is directed to the first bin 70 and is available for recycling. The second stage allows eliminates the need to shred all materials to less than 10 mm as the second stage separates the metal from the electronic media holding element. This reduces the wear on the third stage and allows for the use of larger teeth to maintain fast component destruction.

A third stage involves shredding the non-metal particles received through the chute 68 into debris measuring no greater than 10 mm by 10 mm for collection in a second collection bin 74. In this embodiment a second shredder assembly is employed having an upper level shredder 79 formed by a plurality of clockwise rotating small cut knifes 80 each having a 180 mm outer diameter 82, a 70 mm inner diameter 84 with a 7.8 mm width 86, with forty one teeth 88 formed along the outer diameter 80. Between the knifes 80 are adjoining spacers 90 having a 90 mm outer diameter 92, a 70 mm inner diameter 94 and a 8.30 mm width 96. The outer diameter 92 of the knife 90 having forty one teeth 98 with the knifes 80 and spacers 90 rotatable in a clockwise direction driven by a third gearbox 100 coupled to a third electric motor 102 with a plurality of reciprocal cutting knifes and spacers forming a mirror image to the above described knives 80 and spacers 90. For ease of drawing description the mirror image knives and spacers are not duplicated on the figures. The third gearbox 100 and electric motor 102 driving two parallel but spaced apart drive shafts 110, 112. Each shaft having the aforementioned knifes 80 and spacers A fourth gearbox 120 driven by a fourth motor 122 allows for counter-clockwise rotation of a second set of knifes 80 and spacers 90 along shaft 114 that are interlaced with the first shaft 110. Similar to the third gearbox 120, the fourth gearbox also drives shaft 116 having a plurality of knifes 80 and spacers 90 that are interlaced with knifes and spacers placed on shaft 112. The result is an upper level shredder 79 capable of shredding with the interlaced knifes and spacers, and a lower level shredder 81 directly beneath the upper level shredder 79 with interlaced knifes and spacers. All knifes 80 and spacers 90 used in the upper level shredder 79 and lower level shredder 81 of the third stage are interchangeable constructed and arranged to fine cut material received from the second stage separator in to particles 10 mm×10 mm or less.

Each said knife 80 of the upper level shredder 79 and lower level shredder 81 are constructed from H13 steel having hardness between HRC52 to HRC54. Each spacer 90 of the first and upper and lower level shredders are constructed from H13 steel having hardness between HRC52 to HRC54. The finely ground material that passes through the lower level shredder of the third stage is directed to a second bin 74 for holding non-metal debris for recycling.

Figure 5:
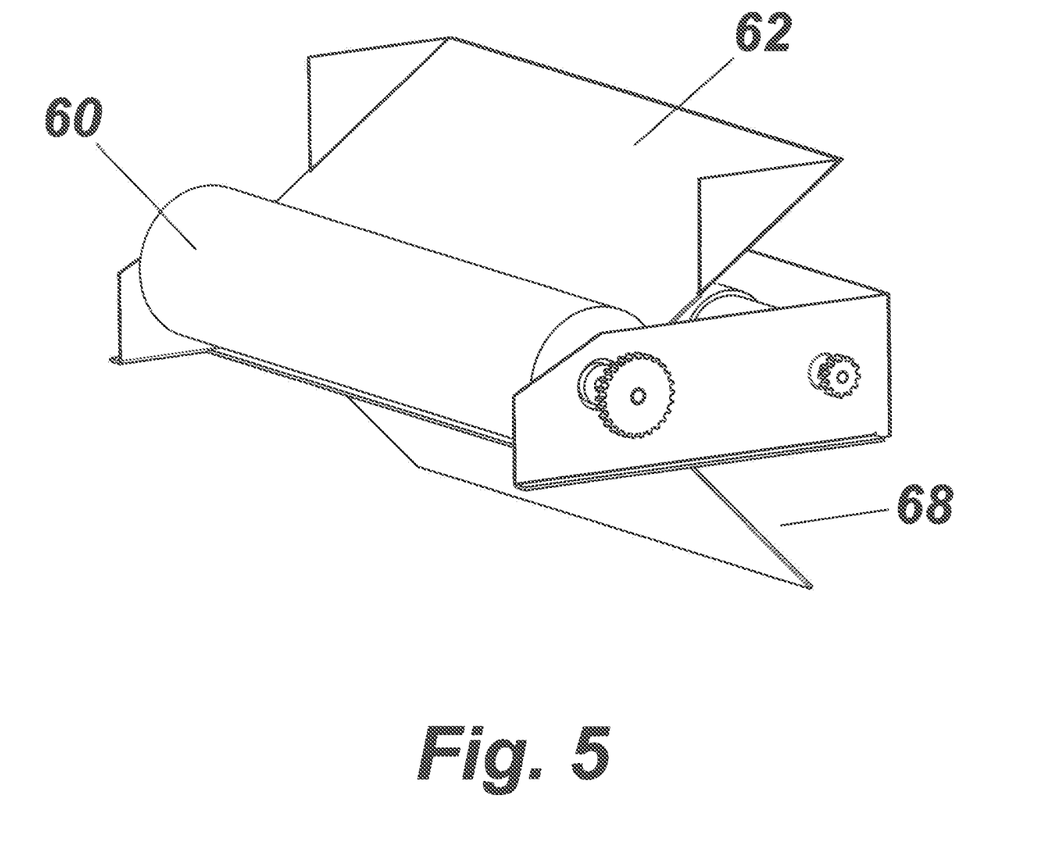
FIG. 5 is a rear perspective view of the magnetic roller.
Figure 6:
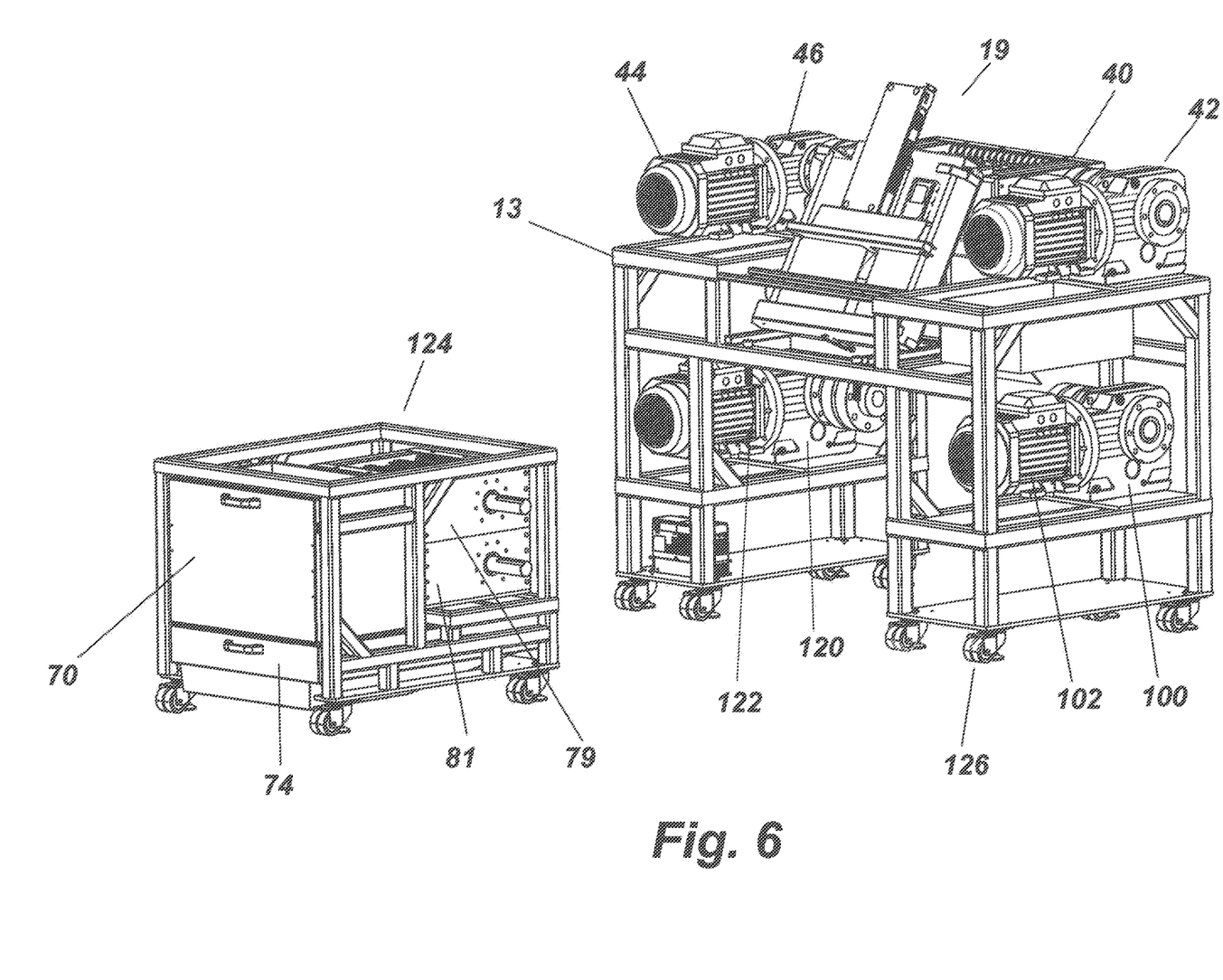
FIG. 6 is an exploded view of the HDD and electronic waste disposal apparatus with shielding removed and the bin carriage separated.
Figure 7A:
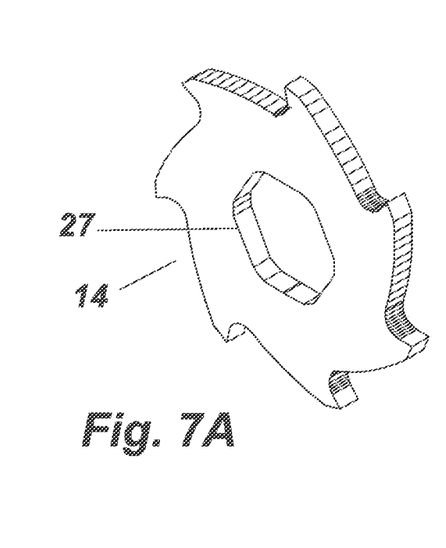
FIG. 7A is a perspective view of a first stage knife.
Figure 7B:
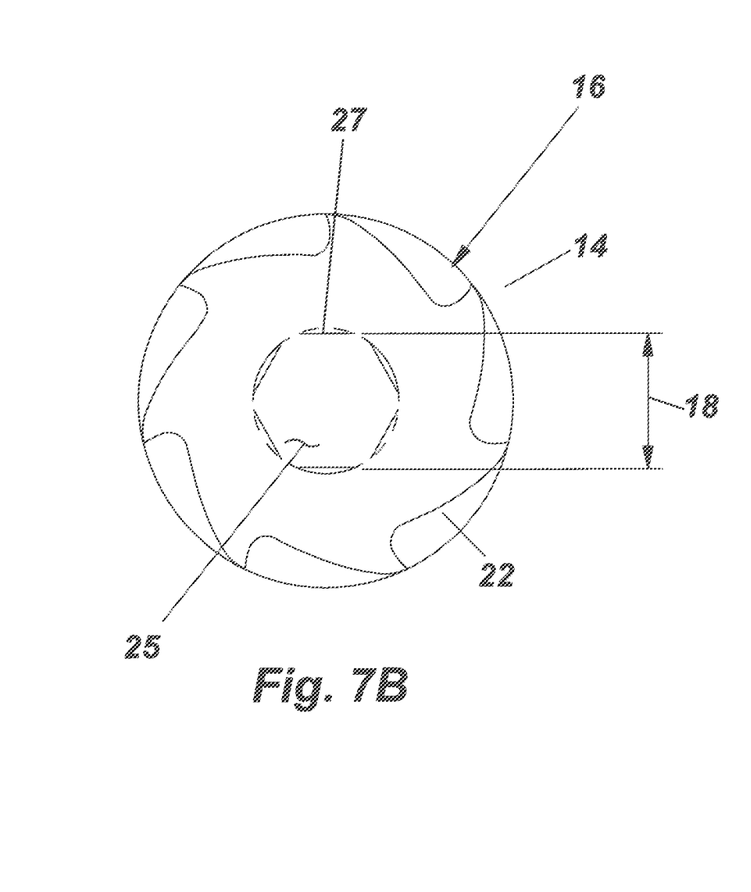
FIG. 7B is a side view of the first stage knife.
Figure 7C:
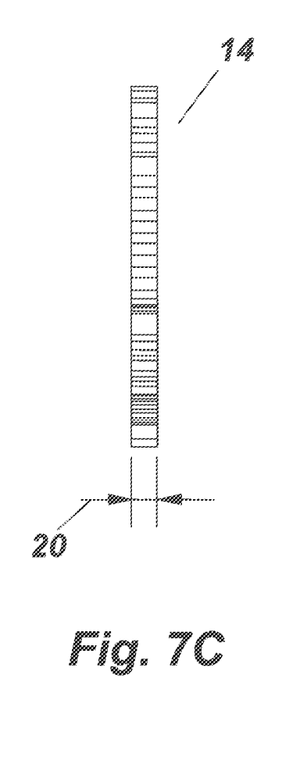
FIG. 7C is an edge view of the first stage knife.
Figure 8A:
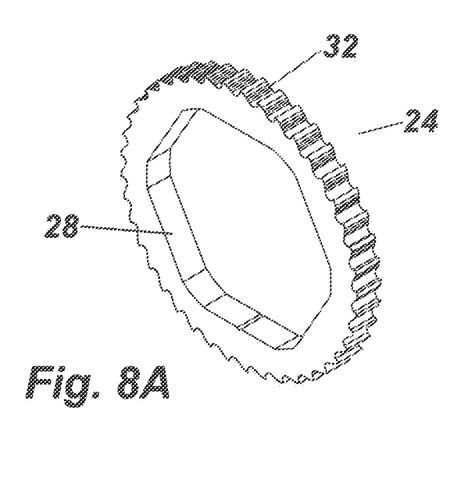
FIG. 8A is a perspective view of a first stage spacer.
Figures 8B, 8C:
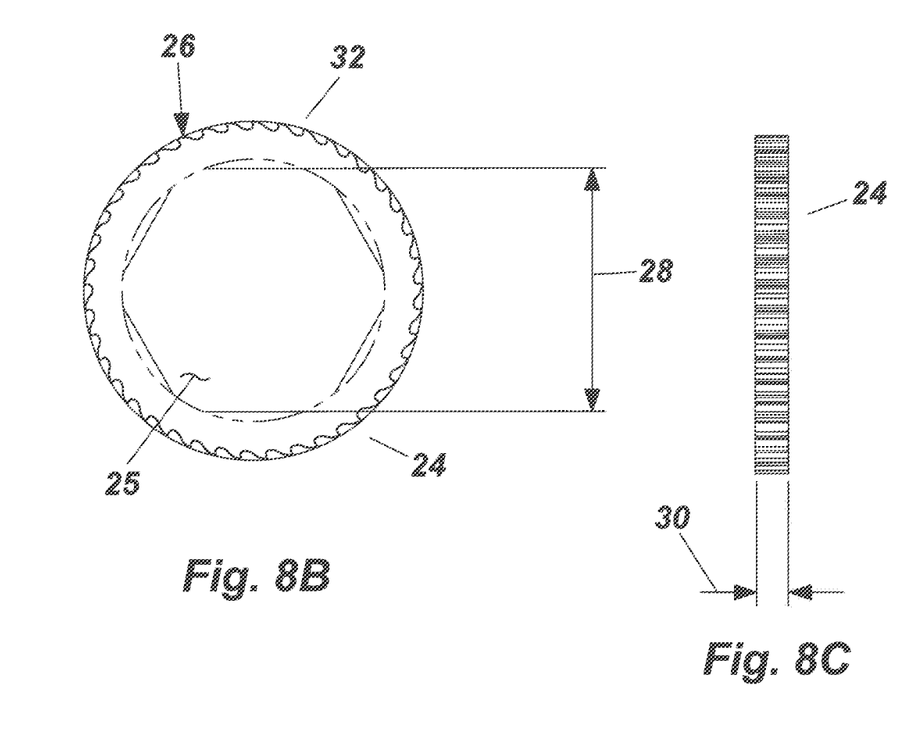
FIG. 8B is a side view of the first stage spacer.
FIG. 8C is an edge view of the first stage spacer.
Figure 9A:
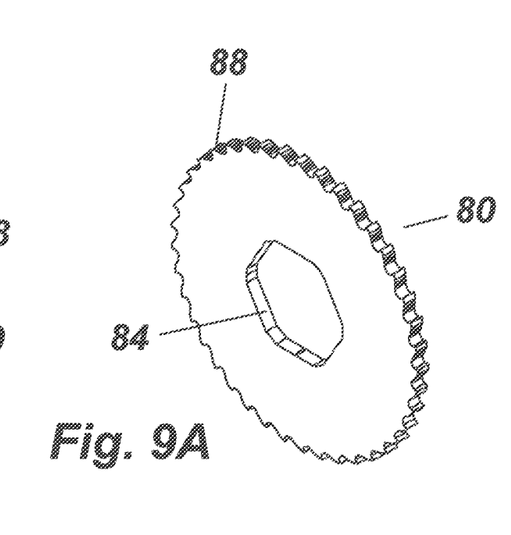
FIG. 9A is a perspective view of a third stage knife.
Figures 9B, 9C:
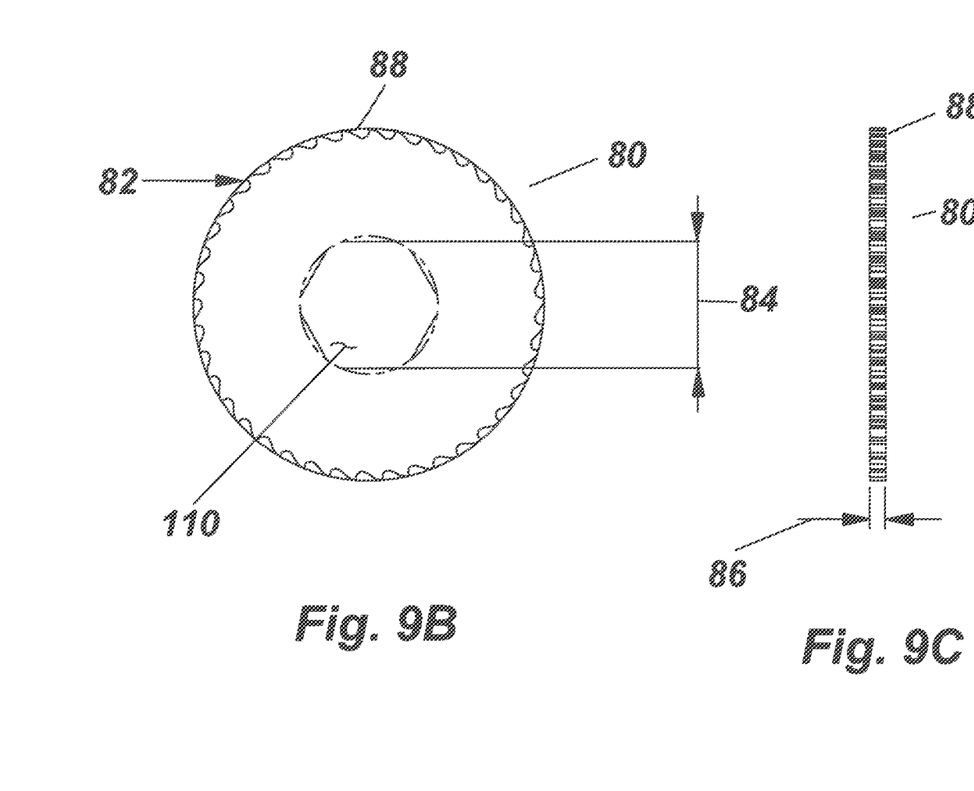
FIG. 9B is a side view of the third stage knife.
FIG. 9C is an edge view of the third stage knife.
Figure 10A:
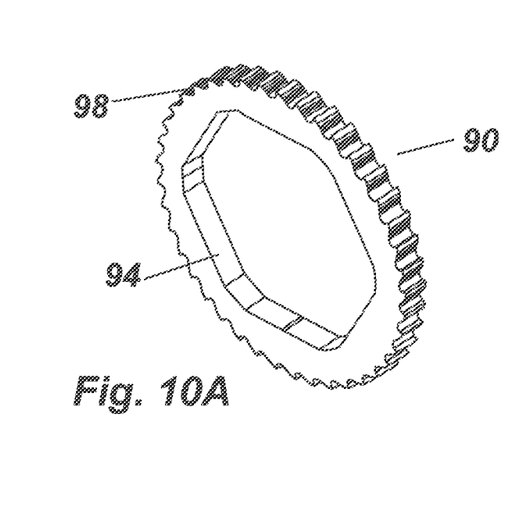
FIG. 10A is a perspective view of a third stage spacer.
Figures 10B, 10C:
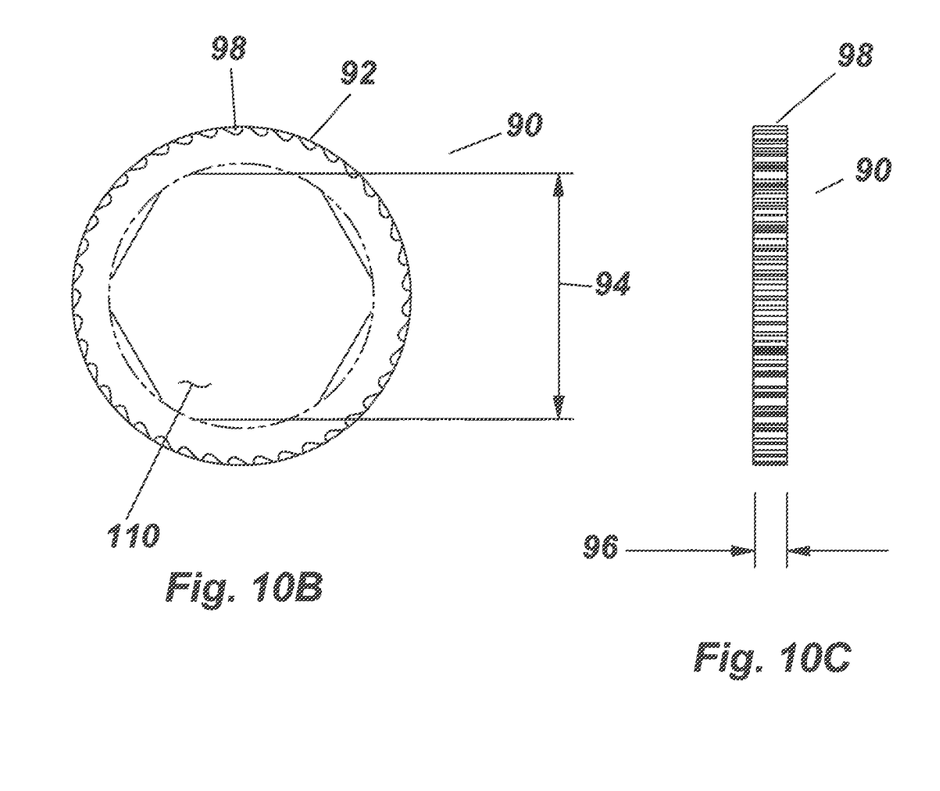
FIG. 10B is a side view of the third stage spacer.
FIG. 10C is an edge view of the third stage spacer.

Referring to FIGS. 5 and 6, illustrated is the mobility of the apparatus having wheels 126 placed along the end of the main frame 122. The wheels 126 are convertible wherein the frame can be made immobile by disengaging the wheels 126 and using an adjustable threaded stand 127. A detachable frame 124 allows for ease of disengagement from the third gearbox 100 and fourth gearbox 120. The detachable frame 124 can be rolled out from the main frame 122 with foot mounted wheels allowing ease of access to the first bin 70 and second bin 74, and maintenance f the upper level shredder 79 and lower level shredder 81 of the third stage.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for HDD destruction and electronic waste disposal comprising:
    a first stage for inserting data storage devices into a first shredder mounted on a support frame, said first shredder constructed and arranged to grind said data storage device into particles no greater than 30 mm by 30 mm;
    a second stage for removing metal particles passed through said first shredder, said second stage comprising a magnetized roller mounted on said support frame wherein shredded particles having metal adhere to said magnetized roller wherein a scraper directs particles from said magnetized roller to a first collection bin positioned on a detachable frame;
    a third stage for grinding articles, said third stage comprising an upper level second shredder mounted to said detachable frame and constructed and arranged to grind the particles passing through said first shredder and directing grinded particles to a lower level third shredder mounted to said detachable frame and constructed and arranged to render the particles into debris measuring no greater than 10 mm by 10 mm for collection in a second collection bin mounted to said detachable frame;
    wherein said first collection bin holds metal debris for recycling and said second collection bin holds non-metal debris for recycling, said detachable frame is mounted on wheels and removable from said support frame for ease of servicing.

2. The method of HDD destruction and electronic waste disposal according to claim 1 wherein said first shredder includes a plurality of clockwise rotating large cut knives each having a 179.92 mm diameter and 12 mm width and a plurality of spacers each having about a 90 mm diameter and 8.80 mm width with forty one teeth coupled to a shaft that is rotatable in a clockwise direction from a first gearbox coupled to a first motor, a plurality of reciprocal cutting knives and blades forming a mirror image of said clockwise rotating knives and spacers are coupled to a counter-rotating shaft coupled to a second gear box driven by a second motor, said first shredder constructed and arranged to grind material passing between said shafts to particles no greater than 30 mm by 30 mm.

3. The method of HDD destruction and electronic waste disposal according to claim 2 wherein each said knife is constructed from H9 steel having hardness between HRC60 to HRC64.

4. The method of HDD destruction and electronic waste disposal according to claim 2 wherein each said spacer is constructed from H13 steel having hardness between HRC52 to HRC54.

5. The method of HDD destruction and electronic waste disposal according to claim 1 wherein said upper level second shredder includes a plurality of clockwise rotating small cut knives each having a 180 mm diameter and 7.8 mm width and spacer having about a 90 mm diameter and 8.30 mm width with forty one teeth rotatable in a clockwise direction juxtaposition with a plurality of reciprocal cutting knives and spacers forming a mirror image of said clockwise rotating knives constructed and arranged to fine cut material received from said second stage.

6. The method of HDD destruction and electronic waste disposal according to claim 5 wherein each said knife is constructed from H13 steel having hardness between HRC52 to HRC54.

7. The method of HDD destruction and electronic waste disposal according to claim 5 wherein each said spacer is constructed from H13 steel having hardness between HRC52 to HRC54.

8. The method of HDD destruction and electronic waste disposal according to claim 5 wherein said lower level of second shredder includes a plurality of clockwise rotating small cut knives each having a 180 mm diameter and 7.8 mm width and spacer having about a 90 mm diameter and 8.30 mm width with forty one teeth rotatable in a clockwise direction juxtaposition with a plurality of reciprocal cutting knives and spacers forming a mirror image of said clockwise rotating knives constructed and arranged to grind cut material received from said upper level of said second separator to particles no greater than 10 mm by 10 mm.

9. The method of HDD destruction and electronic waste disposal according to claim 8 wherein each said knife is constructed from H13 steel having hardness between HRC52 to HRC54.

10. The method of HDD destruction and electronic waste disposal according to claim 8 wherein each said spacer is constructed from H13 steel having hardness between HRC52 to HRC54.

11. An apparatus for HDD destruction and electronic waste disposal comprising:
    a first shredder mounted on a support frame and constructed and arranged to grind said data storage device into particles no greater than 30 mm by 30 mm;
    a magnetized roller mounted on said support frame wherein a scraper is constructed and arranged to direct shredded metal particles to a first collection bin mounted on a detachable frame;

a second shredder constructed and arranged to grind non-metal particles and directing grinded non-metal particles to a third shredder, said second and third shredders mounted on said detachable frame and used to grind said non-metal particles from said first stage into debris measuring no greater than 10 mm by 10 mm for collection in a second collection bin mounted on said detachable frame;

wherein said first collection bin holds metal debris for recycling and said second collection bin holds non-metal debris for recycling, said detachable frame is mounted on wheels and removable from said support frame for ease of servicing.

12. The apparatus for HDD destruction and electronic waste disposal according to claim 11 wherein said first shredder includes a plurality of clockwise rotating large cut knives each having a 179.92 mm diameter and 12 mm width and a plurality of spacers each having about a 90 mm diameter and 8.80 mm width with forty one teeth coupled to a shaft that is rotatable in a clockwise direction from a first gearbox coupled to a first motor, a plurality of reciprocal cutting knives and blades forming a mirror image of said clockwise rotating knives and spacers are coupled to a counter-rotating shaft coupled to a second gear box driven by a second motor, said first shredder constructed and arranged to grind material passing between said shafts to particles no greater than 30 mm by 30 mm.

13. The apparatus for HDD destruction and electronic waste disposal according to claim 12 wherein each said knife is constructed from H9 steel having hardness between HRC60 to HRC64.

14. The apparatus for HDD destruction and electronic waste disposal according to claim 12 wherein each said spacer is constructed from H13 steel having hardness between HRC52 to HRC54.

15. The apparatus for HDD destruction and electronic waste disposal according to claim 11 wherein said second shredder includes a plurality of clockwise rotating small cut knives each having a 180 mm diameter and 7.8 mm width and spacer having about a 90 mm diameter and 8.30 mm width with forty one teeth rotatable in a clockwise direction juxtaposition with a plurality of reciprocal cutting knives and spacers forming a mirror image of said clockwise rotating knives constructed and arranged to fine cut material received from said roller.

16. The apparatus for HDD destruction and electronic waste disposal according to claim 15 wherein each said knife is constructed from H13 steel having hardness between HRC52 to HRC54.

17. The apparatus for HDD destruction and electronic waste disposal according to claim 15 wherein each said spacer is constructed from H13 steel having hardness between HRC52 to HRC54.

18. The apparatus for HDD destruction and electronic waste disposal according to claim 11 wherein a lower level shredder includes a plurality of clockwise rotating small cut knives each having a 180 mm diameter and 7.8 mm width and spacer having about a 90 mm diameter and 8.30 mm width with forty one teeth rotatable in a clockwise direction juxtaposition with a plurality of reciprocal cutting knives and spacers forming a mirror image of said clockwise rotating knives constructed and arranged to grind cut material received from said upper level of said second separator to particles no greater than 10 mm by 10 mm.

19. The apparatus for HDD destruction and electronic waste disposal according to claim 18 wherein each said knife is constructed from H13 steel having hardness between HRC52 to HRC54.

20. The apparatus for HDD destruction and electronic waste disposal according to claim 18 wherein each said spacer is constructed from H13 steel having hardness between HRC52 to HRC54.

21. The apparatus for HDD destruction and electronic waste disposal according to claim 11 including an automatic feeder constructed and arranged to feed electronic components to said first shredder.

* * * * *